United States Patent [19]

Coenen et al.

[11] 4,230,681

[45] Oct. 28, 1980

[54] METHOD OF MANUFACTURING HYDROGEN CHLORIDE FROM SOLUTIONS OF AMINE HYDROCHLORIDES

[75] Inventors: Alfred Coenen; Kurt Kosswig; Bernhard Hentschel; Jürgen Ziebarth, all of Marl, Fed. Rep. of Germany

[73] Assignee: Chemische Werke Hüls AG, Marl, Fed. Rep. of Germany

[21] Appl. No.: 10,048

[22] Filed: Feb. 6, 1979

[30] Foreign Application Priority Data

Feb. 13, 1978 [DE] Fed. Rep. of Germany ....... 2805933

[51] Int. Cl.$^2$ ................................................. C01B 7/08
[52] U.S. Cl. ..................................... 423/481; 423/488; 260/583 N
[58] Field of Search ............................... 423/481, 488; 260/583 N

[56] References Cited

U.S. PATENT DOCUMENTS 4,115,530  9/1978  Coenen ................................. 423/488

OTHER PUBLICATIONS

Stecher et al., Ed. *The Merck Index*, 8th Edition, Merck & Co., Inc., Rahway, N.J. (1968), p. 619.

*Primary Examiner*—Brian E. Hearn

*Attorney, Agent, or Firm*—Gilbert L. Wells

[57] ABSTRACT

A method of manufacturing hydrogen chloride by splitting off hydrogen chloride from solutions of amine hydrochlorides. The hydrogen chloride is split off by heating the amine hydrochlorides at 100° to 250° C. in an inert, organic, essentially non-polar solvent having a boiling point at least 20° C. above the temperature of heating while an inert gas stream is passed therethrough. The hydrogen chloride is then separated from the exiting mixture of inert gas and hydrogen chloride. The amine components of the amine hydrochlorides are tertiary alkylamines, tertiary aryldialkylamines, secondary arylalkylamines, primary alkylarylamines or mixtures thereof which contain 14 to 36 carbon atoms in the side chains bonded to nitrogen. Not more than one of the side chains of the amine component is a methyl group bonded to nitrogen and at least one of the side chains is an aliphatic radical, bonded to nitrogen, containing at least 6 carbon atoms. The inert solvents boil above 120° C. and include straight-chain or branched aliphatic, cycloaliphatic, aromatic or araliphatic hydrocarbons and mixtures of these compounds, or appropriate petroleum fractions, and furthermore open-chain dialkyl ethers, as well as cyclic ethers, cyclic ketones and ketones which are branched in the α-position, saturated or unsaturated perchlorinated aliphatic hydrocarbons and also chloro-, dichloro- and nitro-benzene.

6 Claims, 1 Drawing Figure

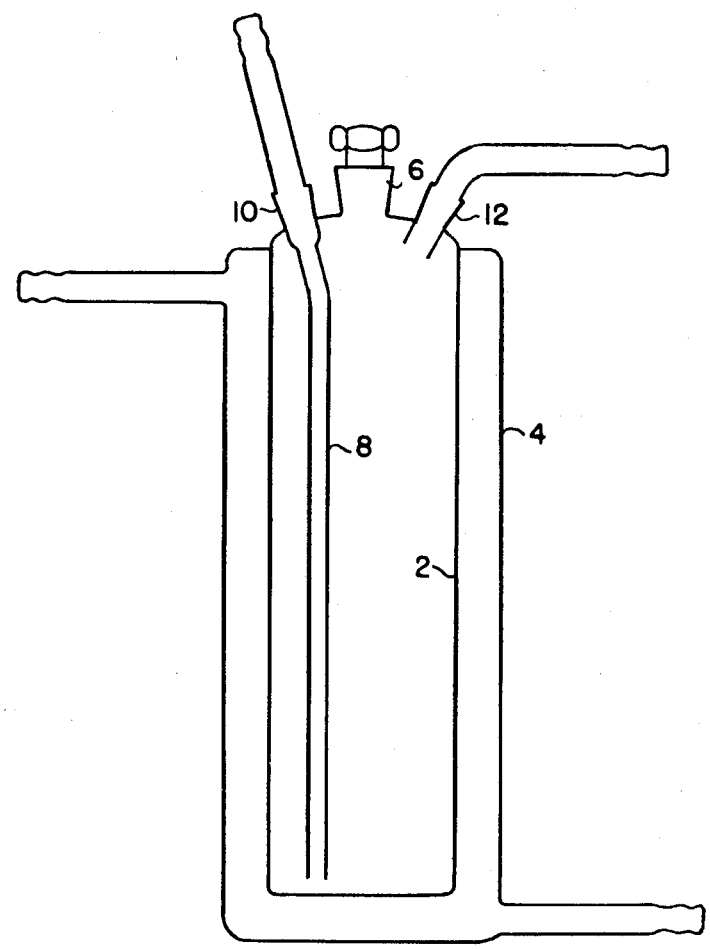

METHOD OF MANUFACTURING HYDROGEN CHLORIDE FROM SOLUTIONS OF AMINE HYDROCHLORIDES

CROSS-REFERENCE TO RELATED APPLICATION

Applicants claim priority under 35 USC 119 for application P 28 05 933.8-41 filed Feb. 13, 1978 in the Patent Office of the Federal Republic of Germany.

BACKGROUND OF THE INVENTION

The field of the invention is the manufacture of hydrogen chloride and the present invention is particularly concerned with hydrogen chloride production from chlorinated hydrocarbons.

The state of the art of the manufacture and processing of hydrochloric acid may be ascertained by reference to the Kirk-Othmer, "Encyclopedia of Chemical Technology" 2nd ed., vol. 11 (1967) pp. 307–337, particularly pp. 314–315 where it is disclosed that 75% of U.S. hydrochloric acid production for the years 1961–66 came from chlorination processes, and pp. 315–323 under the section Gas Treatment, the disclosures of which are incorporated herein.

The closest prior art processes for recovering HCl from amine hydrochlorides are those in which the HCl is liberated by reacting the amine hydrochloride with an acid of low volatility. The amine is thereby obtained in salt form.

SUMMARY OF THE INVENTION

An object of the present invention is to find a process for recovering HCl in which the amine is also obtained in the free form.

This object is achieved by the present process wherein an amine hydrochloride is heated to 100° to 250° C. in an inert, organic, essentially non-polar, solvent having a boiling point at least 20° C. above the temperature of heating while passing an inert gas stream therethrough.

The inert gases suitable for the present invention comprise, but are not limited to, argon, nitrogen, methane, ethane, propane, ethylene and propylene.

The amount of inert gas is chosen so that the volume percent of HCl/inert gas is not less than 3 and preferably 5 to 15%.

The rate of gas flow per hour can be varied preferably from 0.1 to 20 l gas/g salt.

The solvents are employed in a weight ratio of amine hydrochloride to solvent of about 1:9 to about 9:1, preferably 1:4 to 4:1.

BRIEF DESCRIPTION OF THE DRAWING

The drawing shows a schematic side view of the apparatus used in the specific examples of the present invention for splitting off hydrogen chloride from the amine hydrochlorides.

DETAILED DESCRIPTION OF THE PRESENT INVENTION

It has been found, surprisingly, that hydrogen chloride can be split off from certain amine hydrochlorides and carried away from the amine by: passing a gas, which is inert under the conditions being applied, through a solution of the amine hydrochloride. Above 100° C., the amine hydrochlorides, diluted with solvents, already have hydrogen chloride vapor pressures which make recovery of pure hydrogen chloride mixed with an inert gas possible.

Suitable amine hydrochlorides are those with an amine component consisting of tertiary alkylamines, primary alkylarylamines and optionally mixtures of these amines. The amines should have 14 to 36 carbon atoms in the side chains bonded to nitrogen, one of the aliphatic side chains bonded to nitrogen must have at least 6 carbon atoms, that is to say must be at least a cyclohexyl, hexyl or isohexyl radical, and the amino group may carry at most one methyl group. Examples of the amine hydrochlorides include trihexylamine hydrochloride, triheptylamine hydrochloride, trioctylamine hydrochloride, cyclohexyl-diisooctylamine hydrochloride, tri-2-ethylhexylamine hydrochloride, di-2-ethylhexylmethylamine hydrochloride, didecyl-ethylamine hydrochloride, tridodecyl-amine hydrochloride, didodecyl-methyl-amine hydrochloride, dodecyl-diisopropylamine hydrochloride, dodecyl-dibutyl-amine hydrochloride, dodecyl-diisobutylamine hydrochloride, dodecyl-isobutyl-methylamine hydrochloride, diisopentadecyl-methyl-amine hydrochloride, diisopentadecyl-ethyl-amine hydrochloride, diisopentadecylisopropyl-amine hydrochloride, N-octyl-aniline hydrochloride, N-2-ethylhexylaniline hydrochloride, N-laurylaniline hydrochloride, N-isotridecylaniline hydrochloride, N-isopentadecylaniline hydrochloride, N-stearylaniline hydrochloride, N,N-dihexylaniline hydrochloride, N,N-dioctylaniline hydrochloride, N,N-di-2-ethylhexylaniline hydrochloride, N,N-di-dodecylaniline hydrochloride, N-dodecyl-N-methyl-aniline hydrochloride, N-dodecyl-N-ethylaniline hydrochloride, N-dodecyl-N-hexyl-aniline hydrochloride, N,N-dihexyl-p-toluidine hydrochloride, N,N-di-2-ethylbutyl-p-toluidine hydrochloride, N,N-diheptyl-p-toluidine hydrochloride, N,N-dioctyl-p-toluidine hydrochloride, N,N-di-2-ethylhexyl-p-toluidine hydrochloride and p-isooctylaniline hydrochloride.

The solvents used are organic liquids having boiling points above 120° C. which, under the conditions of the process, are inert towards water, hydrogen chloride, amines and exposure to temperature. The boiling point should be as high as possible. There is no upper limit to the boiling point, but, for practical reasons, a certain upper limit is defined by the other physical properties, such as viscosity or melting point. Organic liquids which are suitable for this purpose are, in particular, straight-chain or branched, aliphatic or cycloaliphatic, aromatic or araliphatic hydrocarbons as well as mixtures of these compounds, or corresponding petroleum fractions, for example, decane, tetralin, decalin, tetradecane, xylene, durene, isobutylbenzene, pentylbenzene or dedecylbenzene. However, it is also possible to use open-chain or cyclic ethers, such as, for example, dibutyl ether, diisobutyl ether, hexyl methyl ether, anisole or diphenyl ether and derivatives of tetrahydrofurane and tetrahydropyrane and of 1,4-dioxane, and furthermore ketones which are branched in the α-position (ketones which are not capable of undergoing condensation reactions) or cyclic ketones, such as diisopropyl ketone or 2,6-dimethylcyclohexanone, and also benzene derivatives, such as chlorobenzene, dichlorobenzene or nitrobenzene. Of the unsaturated or saturated aliphatic chlorinated hydrocarbons, only perchlorinated compounds can be used since chlorinated aliphatic compounds which still carry hydrogen atoms as substituents can split off hydrogen chloride under the influence of the amine.

The hydrogen chloride partial pressure above the amine hydrochlorides increases with increasing concentration of the solvent—an effect which is very surprising. Thus, for example, an 80 percent strength solution of tri-(2-ethylhexyl)-amine hydrochloride in tetradecane has a hydrogen chloride pressure of 14 mbars at 140° C., whereas a 20 percent strength solution has a hydrogen chloride pressure of 37 mbars.

The amine hydrochloride solutions envisaged for the thermolysis must be essentially anhydrous, since water inhibits the splitting off of hydrogen chloride. If necessary, the water must be removed before the splitting, for example, by distilling it off by means of an entraining agent. The more non-polar the solvent is, the higher is the hydrogen chloride partial pressure over the solution. Hydrocarbons, such as alkanes or alkyl-aromatic compounds, are therefore particularly suitable for the process. The solvents should have vapor pressures which are as low as possible at the splitting temperature, and their boiling point should be as high as possible, but at least 20° C. above the splitting temperature, i.e., 270° C. for the highest splitting temperature, in order to keep the extent to which they are carried off as a vapor in the inert gas stream as low as possible. The solvents are employed in a weight ratio of amine hydrochloride to solvents of about 1:9 to about 9:1, preferably 1:4 to 4:1. Partial pressure of the hydrogen chloride over the solution increases with an increasing amount of solvent, but, for practical reasons, the dilution of the amine hydrochloride is limited by the amount of product, which increases with the dilution.

The amine hydrochloride solutions from which hydrogen chloride is isolated by thermolysis in the manner described are preferably obtained by extraction of dilute hydrochloric acids. However, amine hydrochlorides which have been obtained by another method can also be dissociated into hydrogen chloride and amine by the process according to the invention. Thus, for example, the hydrochlorides of tertiary aliphatic amines, such as are obtained in the reaction of alkyl chlorides with ammonia, are equally suitable for the process according to the invention.

According to the invention, gaseous hydrogen chloride is obtained from the amine hydrochlorides by heating these compounds to 100° to 250° C., preferably to 120° to 230° C., in an inert solvent, preferably a hydrocarbon, and passing a gas which is inert under the existing conditions through the solutions.

The lower limit of the temperature range indicated is given by the hydrogen chloride partial pressure of the amine hydrochlorides, which then becomes too low, and the upper limit is given by the instability to heat of the amines.

Inert gases which can be employed are all the gases which are chemically inert under the prevailing conditions, that is to say, for example, argon, nitrogen, methane, ethane, propane, ethylene and propylene. The inert gas and the solution must be brought into intimate contact by appropriate devices, such as glass balls or frits and stirrers, inter alia, in order to continuously destroy the state of equilibrium which is rapidly established between the liquid phase and the gaseous phase. The amount of gas which is passed in order to recover a certain amount of hydrogen chloride depends on the partial pressure which is established, independently of temperature and diluent, over the amine hydrochloride.

Thus, for example, for the hydrochloride of tri-(2-ethylhexyl)-amine, the following hydrogen chloride partial pressures were measured at 140° C. over solutions containing 20 percent by weight of amine hydrochloride and 80 percent by weight of solvent:

| Solvent | mbars (HCl) |
| --- | --- |
| tri-(2-ethylhexyl)-amine | 8 |
| hexachlorobutadiene | 17 |
| dodecylbenzene | 32 |
| tetradecane | 37 |
| octadecane | 49 |

In general, the amount of inert gas is appropriately chosen so that the proportion of HCl in the HCl/inert gas mixture is not less than 3 percent by volume.

The process can be carried out continuously and discontinuously. In the case of a continuous procedure, the inert gas and solution are passed in counter-current in order to achieve as high a concentration as possible of the hydrogen chloride in the inert gas. HCl concentrations of over 50% can be achieved with the counter-current procedure.

The hydrogen chloride can easily be produced in the pure form from the HCl/inert gas mixture as disclosed in Kirk-Othmer, ibid., for example, by adsorption, but, depending on the intended use of the HCl, it is not necessary in all cases. For example, if ethylene is used as the carrier gas, the gas mixture obtained can be employed directly for the synthesis of chloroethanes.

One of the great advantages of the present process is that the amine is obtained in the free form, which can then be used as such. It is not absolutely necessary to separate the amine from the solvent used, since the mixture of amine and solvent can be used as such for many purposes, for example, the extraction of hydrogen chloride from dilute hydrochloric acid.

SPECIFIC EXAMPLES

Example 1

The apparatus for splitting the amine hydrochlorides is shown in the Figure of the Drawing and consists of a cylindrical gas vessel 2 surrounded up to the upper edge by a jacket 4 through which a thermostatically controlled heat transfer oil is pumped. The vessel has three nozzles at the top. The product is filled into the vessel through the middle nozzle 6, and (if appropriate) solvent is also subsequently metered in, and this nozzle is closed during the execution of the example. A tube 8 is passed through the second nozzle 10 down to the bottom of the vessel and the inert gas is passed into a liquid through this tube. The gases are removed through the third nozzle 12 and the hydrogen chloride is collected in sodium hydroxide solution.

26.7 g of a solution of 5.3 g of tri-(2-ethylhexyl)amine hydrochloride in 21.3 g of octadecane is heated to 140° C. in the reaction vessel. 47 l of nitrogen per hour is passed through the solution. The solution initially contains 0.51 g of hydrogen chloride. 57% thereof has passed over in the gaseous form after 7 minutes, 89% thereof after 15 minutes and 96% thereof after 35 minutes.

Example 2

7.2 g of tri-(2-ethylhexyl)-amine hydrochloride, dissolved in 28.9 g of octadecane, is initially introduced into the apparatus described in Example 1. 170 l of nitrogen/hour is passed through the solution at 139° C. Of the 0.69 g of hydrogen chloride which the solution originally contained, 48% has been split off as gaseous hydrogen chloride after 3 minutes, 83% after 6 minutes and 96% after 10 minutes.

Example 3

29.6 g of a solution of 5.9 g of tri-(2-ethylhexyl)amine hydrochloride in 23.7 g of tetradecane is heated to 141° C. in the apparatus described in Example 1, while passing therethrough 47 l of ethylene/hour. The solution originally contains 0.55 g of hydrogen chloride. 51% of hydrogen chloride has been split off after 7 minutes, 78% after 15 minutes and 96% after 29 minutes.

Example 4 (for comparison)

6.5 g of tri-(2-ethylhexyl)-amine hydrochloride in 25.9 g of tri-(2-ethylhexyl)-amine are heated to a high temperature of 197° C. in the apparatus described in Example 1, while passing 47 l of ethylene/hour therethrough. The solution contains 0.62 g of hydrogen chloride, and 40% thereof has been carried off by the ethylene after 6 minutes, 61% thereof after 12 minutes, 69% thereof after 23 minutes and only 81% thereof after 35 minutes.

Example 5

5.8 g of trioctylamine hydrochloride, dissolved in 23.0 g of octadecane, is heated to 162° C. in the apparatus described in Example 1. 47 l of nitrogen per hour is passed through the solution. Of the 0.54 g of hydrogen chloride, 11% has been carried off in the nitrogen stream after 15 minutes and 22% after 50 minutes.

EXAMPLE 6

Example 5 is repeated at 183° C. 23% of the hydrogen chloride has been split off after 15 minutes and 44% after 50 minutes.

Example 7

Example 5 is repeated at 207° C. 45% of the hydrogen chloride has been carried off with the nitrogen after 15 minutes and 81% after 50 minutes.

Example 8

Example 5 is repeated at 233° C. 71% of the hydrogen chloride has already been carried off with the nitrogen after 15 minutes.

Example 9

In order to obtain a measure of the effective rate of splitting of tri-(2-ethylhexyl)-amine hydrochloride (TEHA hydrochloride) as a function of the solvent added, splitting experiments are carried out at 140° C. in the apparatus described in Example 1. The amount of hydrogen chloride, in percent of the hydrogen chloride originally present in the solution and based on 0.3 l of nitrogen passed through and on 1 g of TEHA hydrochloride initially introduced, split off in the first 10 minutes is indicated in the table, as a function of the nature of the solvent. 20 parts of TEHA hydrochloride in 80 parts of solvent is employed.

| Solvent | % of HCl split off |
| --- | --- |
| tetradecane | 15 |
| octadecane | 23 |
| dodecylbenzene | 15 |
| TEHA (for comparison) | 4 |

Example 10

The rate at which hydrogen chloride is split off increases as the rate at which the inert gas is passed through an amine hydrochloride solution increases.

An inert gas is passed through solutions of 20 percent by weight of tri-(2-ethylhexyl)-amine hydrochloride in 80 percent by weight of tetradecane at 142° C. at various rates, analogously to Example 1. The following percentages of the theoretical amount of hydrogen chloride, based on one gram of amine hydrochloride, are split off in the first 10 minutes:

0.54 l of nitrogen/10 minutes: 36%
1.3 l of ethylene/10 minutes: 63%
3.2 l of ethylene/10 minutes: 88%

We claim:
1. A method of manufacturing hydrogen chloride from solutions of amine hydrochlorides comprising:
  (a) heating said solutions in an inert, organic essentially non-polar solvent at temperatures of about 120°–230° C., said solvent having a boiling point at least 20° C. above said temperature of heating;
  (b) simultaneously with said heating, passing an inert gas stream through the heated solutions of (a) to split off hydrogen chloride and produce a mixture of hydrogen chloride and said inert gas; and
  (c) separating said hydrogen chloride from said mixture of (b) wherein the amine component of said amine hydrochlorides is selected from the group consisting of tertiary alkylamines, tertiary aryldialkylamines, secondary arylalkylamines, primary alkylarylamines or mixtures thereof, each of said amine components containing 14 to 36 carbon atoms in the side chains bonded to nitrogen, not more than one of the side chains being a methyl group bonded to nitrogen and at least one of the side chains being an aliphatic radical, bonded to nitrogen, containing at least 6 carbon atoms.
2. The method of claim 1, wherein said solvent is selected from the group consisting of straight-chain aliphatic hydrocarbons, branched aliphatic hydrocarbons, cycloaliphatic hydrocarbons aromatic hydrocarbons, aralaliphatic hydrocarbons, petroleum fractions, open-chain dialkyl ethers, cyclic ethers, cyclic ketones, ketones which are branched in the α-position, saturated or unsaturated perchlorinated aliphatic hydrocarbons, chlorobenzene, dichlorobenzene, nitrobenzene and mixtures thereof.
3. The method of claim 1, wherein the weight ratio of said amine hydrochlorides to said solvent of step (a) is about 1:9 to 9:1.
4. The method of claim 1, wherein said mixture of hydrogen chloride and said inert gas produced is not less than about 3 volume percent hydrogen chloride.
5. The method of claim 1, wherein the volume percent of HCl/inert gas in step (b) is not less than 3%.
6. The method of claim 6, wherein the volume percent of HCl/inert gas in step (b) is 5 to 15%.

* * * * *